United States Patent [19]

Lenz et al.

[11] Patent Number: 4,857,727
[45] Date of Patent: Aug. 15, 1989

[54] OPTICALLY POWERED REMOTE SENSORS WITH TIMING DISCRIMINATION

[75] Inventors: James E. Lenz, Brooklyn Park; Paul E. Bjork, New Brighton; Hisatoshi Fujiwara, Brooklyn Park, all of Minn.

[73] Assignee: Honeywell Inc., Minneapolis, Minn.

[21] Appl. No.: 193,008

[22] Filed: May 12, 1988

[51] Int. Cl.[4] ................................. H01J 5/16
[52] U.S. Cl. ................................... 250/227; 455/612
[58] Field of Search ............... 250/227; 455/602, 605, 455/608, 610, 612

[56] References Cited

U.S. PATENT DOCUMENTS 4,345,482  8/1982  Adolfsson et al. ................. 250/227
4,678,905  7/1987  Phillips .............................. 250/227

OTHER PUBLICATIONS

Ohte et al., "Optically Powered Transducer with Optical-fiber Data Link," SPIE, vol. 478, 1984, pp. 33–38, Fiber Optic and Laser Sensors II.
Bjork et al., "Optically Powered Sensors," Preprint: Jan. 1988, Optical Fiber Sensors Conference, pp. 1–4.
Oote, "Photoelectric Converter," 58-207020(A), Japanese Patent Abstracts.
Oote, "Optical Transmission System", 58-146152(A), Japanese Patent Abstracts.
Oote, "Optical Transmission System," 58-146153(A) Japanese Patent Abstracts.
Ote, "Temperature Signal Transmitter," 61-159122(A), Japanese Patent Abstracts.

Primary Examiner—David C. Nelms
Attorney, Agent, or Firm—John G. Shudy, Jr.

[57] ABSTRACT

An optically powered fiber optic sensor system having a control end sending, with a laser diode or light-emitting diode, optical power and a clock signal exclusively through an optic fiber to a sensing end having sensors, a clock signal picking-off circuit, a return signal light-emitting diode, and needed analog and digital circuitry, all energy dependent upon the optical power transmitted through the optic fiber to the control end. The optically powered sensor end is feasible because of recent advances in technology resulting in micro-powered devices such as the analog-to-digital converter, operational amplifiers, logic circuits, and other low-powered items.

19 Claims, 9 Drawing Sheets

Fig.-3A
SENSING END CIRCUIT

Fig.-3B

*Fig.-8*
ANALOG VERSION

NOTE: A DIGITAL VERSION INCORPORATING DIGITAL SWITCHES MAY BE USED, ELIMINATING THE A/D CONVERTER

*Fig.-11*
SENSING END PROXIMITY SWITCH

OPTICALLY POWERED REMOTE SENSORS WITH TIMING DISCRIMINATION

BACKGROUND OF THE INVENTION

The present invention pertains to sensors and particularly to fiber optic sensors. More particularly, the invention pertains to optically powered fiber sensors.

Although fiber optic sensors offer great potential, few such products are readily available on the market. The related art reveals four concepts for standardizing and multiplexing fiber optic sensors for a system (e.g., aircraft). These concepts include interferometric phase modulation, time domain modulation, optical spectrum modulation and carrier intensity modulation.

Interferometric phase modulation utilizes interference between signal and reference light beams on single mode fibers. Sagnac interferometers are used for rotation-sensing gyros and optical resonators. Mach-Zehnder interferometer configurations are most often used for applications such as fiber optic underwater hydrophones and magnetic field sensors. Research shows these types of sensors to be quite vulnerable to noise sources such as vibrations, laser instabilities, and temperature drifts. Also it is difficult to interface these sensors to a standard optical interface because of their high instrumentation requirements and specialization.

Sensors which employ the principle of time domain modulation of optical power encode sensed information in optical power level as a function of time. Two types of this modulation are pulse duration and pulse delay. In pulse duration, the length of the optical pulse varies with sone environmental parameter. An example is the fluoresence time length due to an optical pulse impinging on a temperature-dependent fluorescent material in a temperature sensor. In pulse delay, the optical path length varies according to some physical basis causing the variation in the arrival or return time of an optical pulse. Radar and optical time domain reflectometry are two examples. A microbending sensor has been used in the optical time domain reflectometry scheme to implement a pressure sensor/transducer. Such use resulted in inaccurate, inefficient and costly, but needed, instrumentation. Also, such scheme has a high sensitivity to environmental vibration. It is difficult to build small rugged sets of delay lines resistant to microbending optical losses. Multiplexing more than one sensor to a fiber for this scheme is difficult.

In optical spectrum modulation, the spectrum of an optical source is directly modified by some physical process which may include wavelength dependent variations in the refractive index propagation constant, or wavelength selective transmission using some type of chromatic dispersion element. Some problems with this approach of modulation are the decrease in the signal-to-noise ratio from division of the energy into a number of spectral bands, difficulties in multiplexing sensors and developing a standard interface, and the problem of single fiber approaches having optical source light from the interface module mixed with the data where backscatter from connectors tends to swamp the weak direct current (DC) data signal.

In carrier intensity modulation, some effect is utilized to modify the intensity of the optical light, or carrier, used to convey the sensed information. Simple analog intensity modulation schemes are rarely used because of their sensitivity to variations in optical source intensity and fiber interconnect losses. Data encoding schemes, in which the magnitude of the sensed parameter is linearly mapped into a carrier modulation frequency (double sideband and intensity modulation), are popular. Schemes using this voltage to frequency conversion technique to transmit transducer information to any optical interface module suffer from some drawbacks. These drawbacks include high power required for data conversion and transmission, difficulty in multiplexing several sensors and accurately determining the transmitted frequency in a short amount of time.

Related art reveals examples of optically powered sensor schemes. One has a fiber that carries optical power from the monitor or control end to the sensor end. A second fiber returns the sensor signal to the control end. Another scheme utilizes one fiber for both sending optical power to the sensor end and returning the sensor signal to the control end. There are two variations of the latter scheme. One uses a half-silvered mirror at each end. Half-silvered mirrors ae not very efficient. A second uses a dichroic mirror, having greater efficiency and whose reflectively depends on wavelength, at each end and two different wavelengths are used for the power transmission and for sensor signal return, respectively. Both variations are designed to deal with only one sensor and their feasibility has not been clearly demonstrated.

SUMMARY OF THE INVENTION

The invention avoids the problems of the above-noted related art schemes. The present invention, with the recent advent of micro-powered A/D converters, operational amplifiers, logic circuits, etc., has made optically powered sensors feasible in that sufficient optical power is transmitted via a single optical fiber to the sensing end for the sensors and associated electronics, including a multiplexing system for various sensors, to function adequately on that power alone. The invention incorporates timing and synchronization protocol between the control and sensing ends allowing for multiplexing techniques at the sensing end and thereby resulting in a multiple optically powered sensors utilizing only one fiber between the control and sensing ends.

Also the present invention has been proven to be workable and practicable. The invention is easily implementable in that it utilizes: (1) proven sensors that meet the necessary performance and environmental requirements; (2) existing sensor technologies for meeting a wide variety of applications; (3) a simple yet ruggedized optical packaging technique developed by the fiber optic communications technology; (4) a standard single optical fiber interface at both the sensing and the receiving end for all sensors; (5) a standard single photodiode, in conjunction with a voltage step-up transformer, or multiple photodiodes for reception of optical power at the sensing end; (6) available light-emitting or laser diodes for multiple wavelength transmission and photodiodes for multiple wavelength reception; and (7) an ability to multiplex bits of data from multiple sensors on a single data link.

A great advantage of the optically powered sensor is that the system is virtually free from electromagnetic interference (EMI) between the sensors and the readout. Another advantage is the weight savings of optic fiber over that of copper wires.

DESCRIPTION OF THE PREFERRED EMBODIMENT

Figure 1:
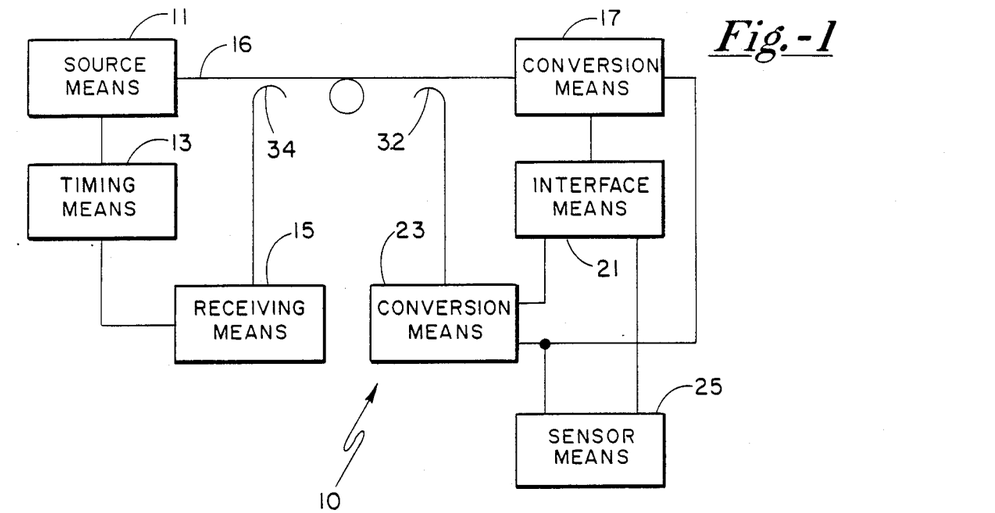
FIG. 1 in a block diagram of the present invention.

FIG. 1 is a block diagram showing the basic components of optically micro-powered sensor apparatus 10. Timing means 13 has the necessary clock-generating electronics. A clock-based triggering signal goes to source means 11 which sends out light timing signals and optical power through optic fiber 16 to conversion means 17. Conversion means 17 converts the optical signals and optical power to electrical signals and electrical power. The electrical power from conversion means 17 provides all the power requirements for interface means 21, conversion means 23 and sensor means 25. Interface means 21 picks off the timing signals from conversion means 17. Interface means 17 provides the logic, timing, multiplexing and amplifying requirements for sensor means 25 and conversion means 23. Sensor means 25 consists of all the sensor devices from which parameter information is obtained. The information is processed by interface means 21 into appropriate time-based signals which are converted into return light signals by conversion means 23. The return light signals are coupled onto optic fiber 16 by coupler 32. These return light signals are coupled off of fiber 16 by coupler 34 onto receiving means 15. Receiving means 15, in conjunction with timing means 13, converts the return light signals into appropriate electrical signals which are converted into intelligible data about parameters measured by sensor means 25.

Figure 2A:
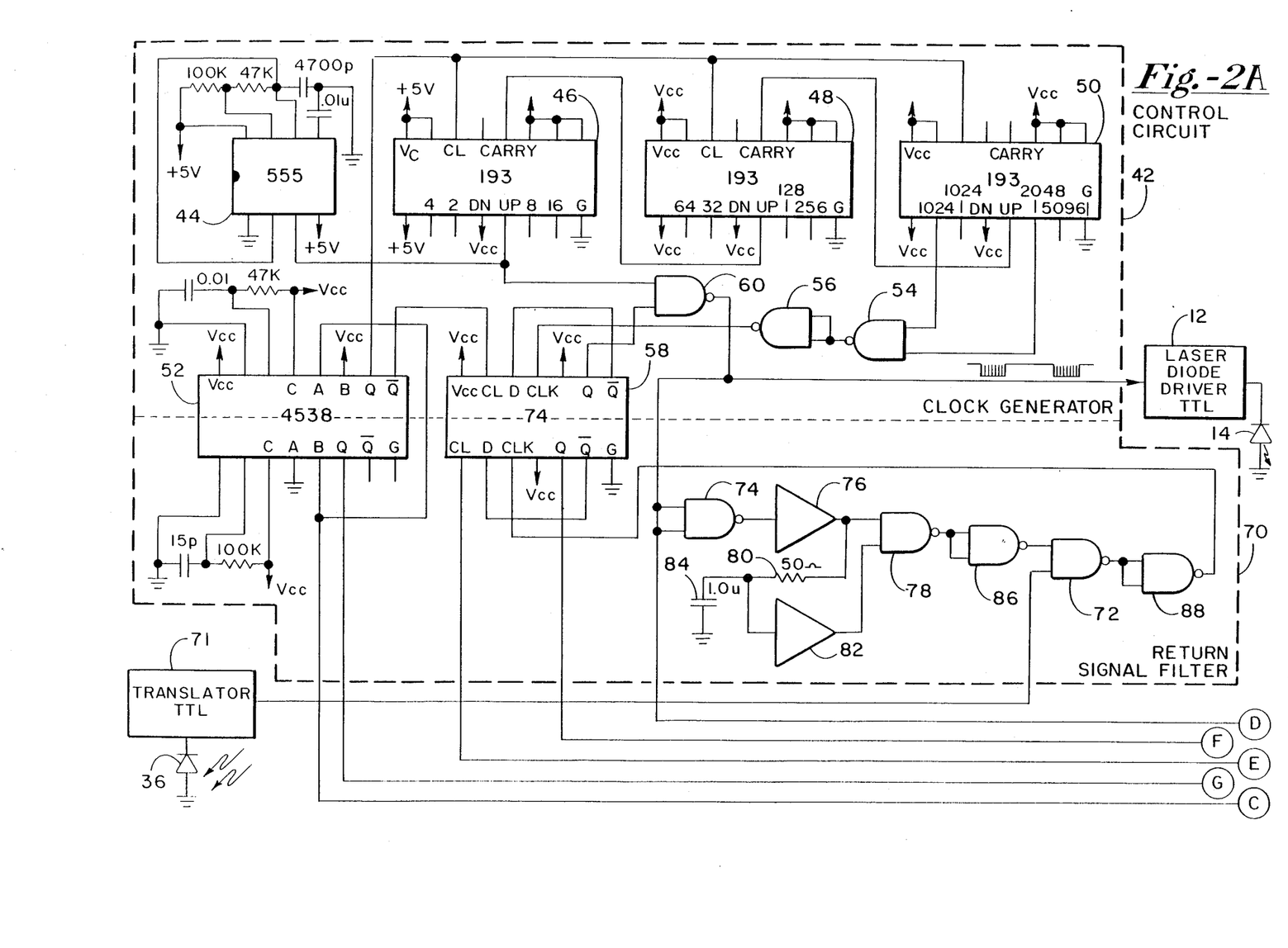
FIGS. 2a and 2b show a schematic of the control end of an embodiment of the invention.
Figure 2B:
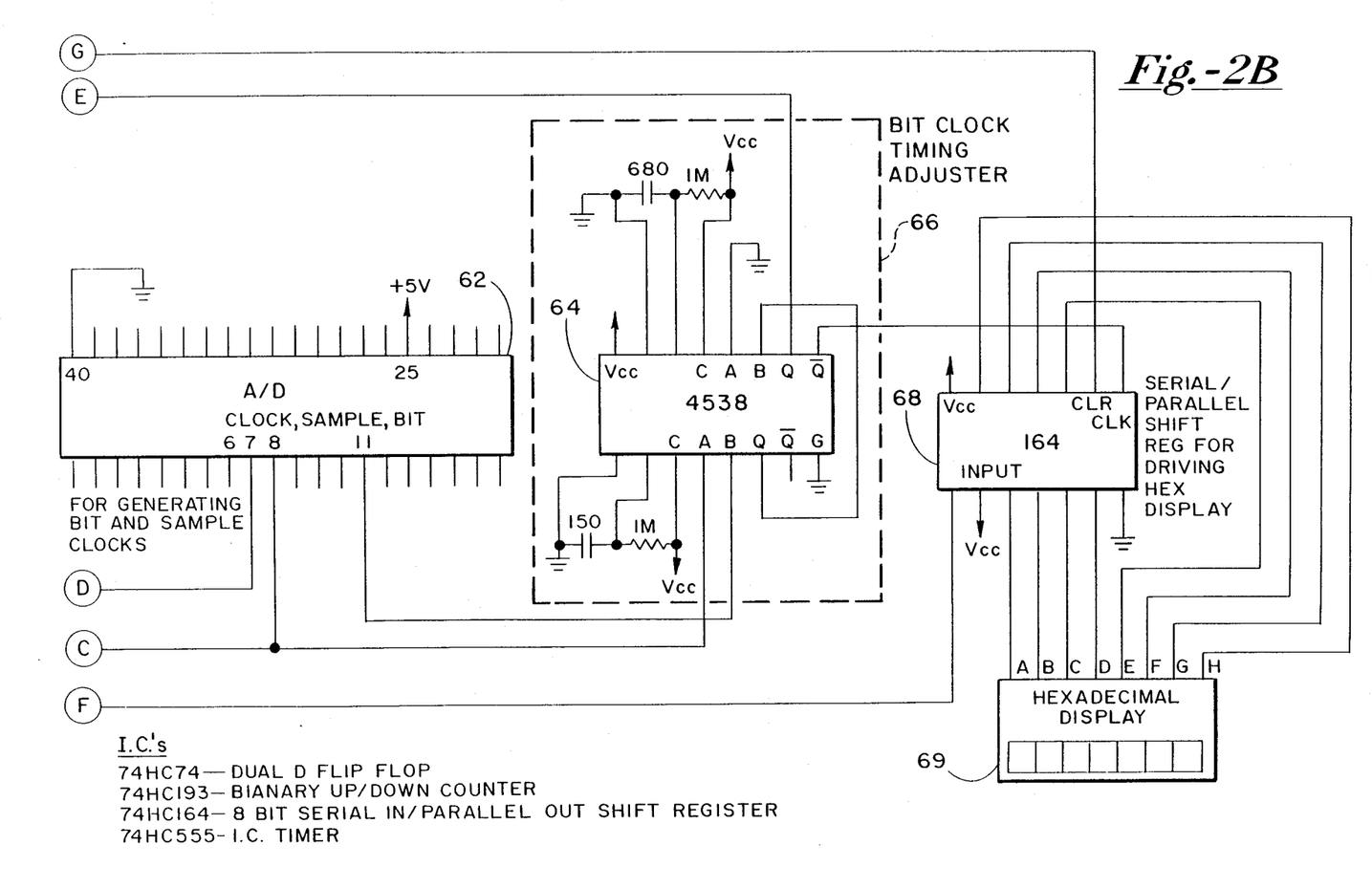

FIG. 2 is a schematic of the control end of the invention. Clock generator 42 provides the timing for the optically powered sensor system. Oscillator 44 generates a square wave of about 1600 hertz (Hz). Oscillator 44 is a type 74HC555 integrated circuit timer. The output of oscillator 44 goes to binary up/down counter 46. The output of binary up/down counter 46 goes to binary up/down counter 48 which has an output that goes to binary up/down counter 50. Counters 46, 48 and 50 are type 74HC193 integrated circuits. The counters 46, 48 and 50 are cleared by the Q output of the first multivibrator of chip 52 which is a 74HC4538 type integrated circuit. The 1024 and 2048 outputs of counter 50 go to NAND gate 54. The output of NAND gate 54 is inverted by NAND gate 56. The output of gate 56 goes to a clock input of the first of the two D flip-flops in integrated circuit 58 which is a 74HC74 type integrated circuit. The Q output is connected to the D input of the first flip-flop of integrated circuit 58. The Q output is connected to an input of NAND gate 60. The Q output of the first multivibrator of chip 52 goes to the clock input of the first flip-flop of chip 58. The output of oscillator 44 is connected to an input of gate 60. The output of gate 60 is connected to the clock input of the analog-to-digital (A/D) converter 62, which is a Honeywell integrated circuit type H721 CMOS eight bit A/D converter. The sample pulse or clock output of A/D converter 62 is connected to the A terminal of the first multivibrator and the B terminal of the second multivibrator of chip 52.

The three binary up/down counters 46, 48 and 50, along with NAND gates 54 and 56, count the 1600 Hz pulses from oscillator 44 for about 980 milliseconds, in that NAND gate 60 is off for about 980 milliseconds. When gate 60 is on, then the 600 Hz square wave from oscillator 44 goes through gate 60 and on to the clock input, terminal 7, of A/D converter 62 which in turn causes the sample output, terminal 8, to go high after counting 25 clock pulses. When the sample output goes high, which goes to terminals A and B of the first and second multivibrators, respectively, in chip 52, the first multivibrator outputs a signal that clears binary counters 46, 48 and 50, and gate 60 output goes low for 980 milliseconds again. The operation repeats itself. The output of gate 60 also goes to laser diode driver 12 which accepts transistor-transistor logic (TTL) signals.

The sample pulse output of converter 62 goes to input A of a second multivibrator of chip 64 which is a type 74HC4538 integrated circuit having a first and a second multivibrator. Chip 64 essentially comprises bit clock timing adjuster 66 which is capable of delaying the bit clock of synchronizing. Converter 62 provides a bit clock output, terminal 11, which synchronizes each bit of the conversion signal. The bit clock output is the clock input, terminal 7, divided by 25. Converter 62 is used for synchronizing the clock between the sending end and the control end. The Q output of the second multivibrator of chip 64 goes to the B input of the first multivibrator of chip 64. The Q output of the first multivibrator of chip 64 goes to the clear input of the second flip-flop of chip 58. The Q output of the second multivibrator of chip 64 supplies a clock to shift register 68 which changes the format of the data from serial to parallel for driving hexadecimal light-emitting-diode (LED) readout 69 connected to terminals A through H from register 68. Register 68 is an 8 bit serial/parallel shift register of integrated circuit type 74HC164.

Figure 4:
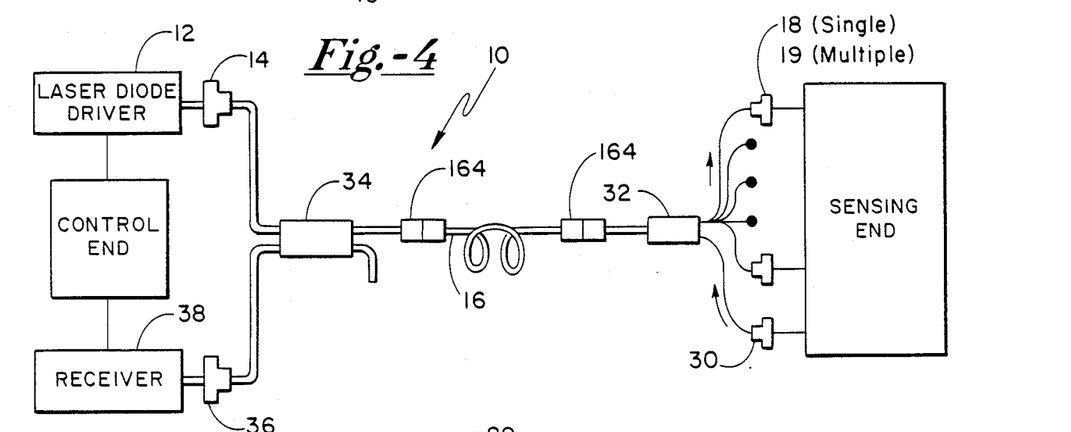
FIG. 4 shows basic components of the invention.

Signals from opto-electro converter 36, in FIGS. 2 and 4, include noise such as that caused by Fresnel reflection in optical fiber 16. The electrical signals from converter or diode 36 are put into a form compatible with TTL circuitry by translator 71. The signals consist of a control signal and serial data which go to NAND gate 72 of return signal filter 70. From NAND gate 60 comes a signal which is high for 980 milliseconds and then has twenty-five pulses, alternately, and which goes to a NAND type inverter 74. The signal from inverter 74 goes to buffer 76. The output of buffer 76 is connected to an input of NAND gate 78 and to 50 ohm resistor 80. The other end of resistor 80 is connected to the input of buffer 82, and to 1 microfarad capacitor 84 which is grounded at the other end. The output of buffer 76 is connected to an input of gate 78. The output of gate 78 goes through NAND inverter 86. The output of inverter 86 is connected to an input of gate 72 having an output connected to a NAND gate inverter 88 in turn having an output connected to the clock input of the second flip-flop of chip 58. The second flip-flop of chip 58 is part of return signal filter 70. The Q output of the second flip-flop of chip 58 is effectively the output of return signal filter 70. Chips 52 and 58 allow only data that come immediately after the bit clock in the form of 8 bit serial data. Filter 70 effectively removes the noise and the control signal from the signals from opto-electro converter 36, via translator 71, and picks up only the serial data from the sensing end. The serial data from the Q output of the second flip-flop of chip 58 goes to the input of register 68 for processing, as noted above.

Figure 3A:
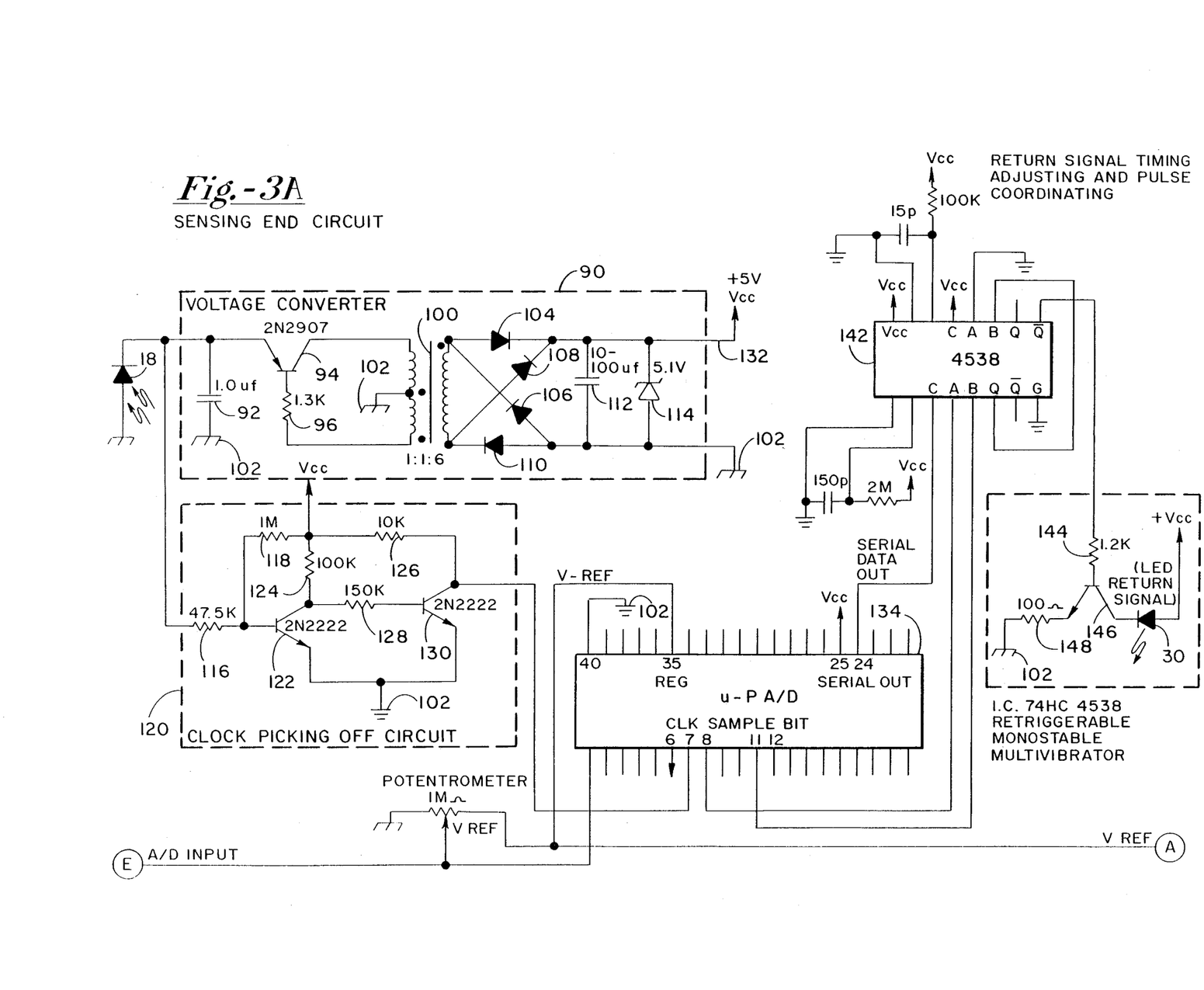
FIGS. 3a and 3b describe a schematic of the sensing end of an embodiment of the invention.
Figure 3B:
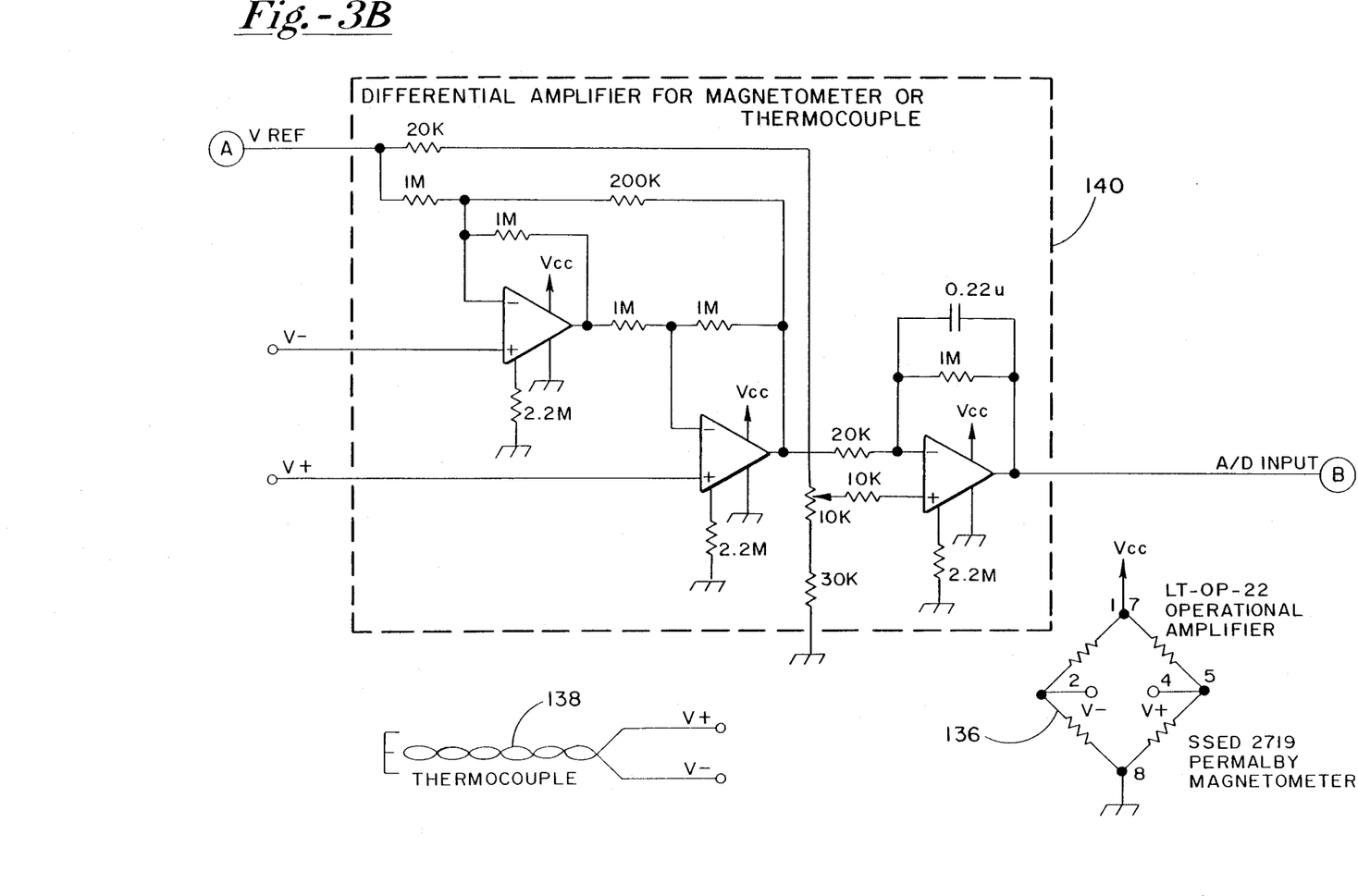

FIG. 3 is a schematic of the sensing end of the invention. From photodiode 18, of FIG. 4, comes electricity converted from the light received by diode 18 through optic fiber 16. The electricity goes to direct current (DC) to DC voltage converter 90. Converter 90 input is connected to a 1 microfarad capacitor 92 and to the emitter of 2N2907 PNP transistor 94. The base of transistor 94 is connected to 1300 ohm resistor 96. Resistor 96 is connected to one end of a center-tapped transformer primary winding (of transformer 100) having the other end connected to the collector of transistor 94. The center tap is connected to reference terminal 102 which is connected to the anode of diode 18. Capacitor 92 is connected to terminal 102. Transistor 94, resistor 96, capacitor 92 and the primary winding of transformer 100 compose the switching circuit of converter 90. The switch circuit converts DC electricity into alternating current (AC) electricity, so that transformer 100 can be used in voltage conversion.

The secondary winding of transformer 100 has six times more turns than each of the primary windings of transformer 100. One end of the secondary winding of transformer 100 is connected to the anode of diode 104 and to the cathode of diode 106. The other end of the secondary winding of transformer 100 is connected to the anode of diode 108 and to the cathode of diode 110. The cathodes of diodes 104 and 108 are connected to the cathode of 5.1 volt zener diode 114. The anodes of diodes 106 and 110 are connected to the anode of zener diode 114 and to terminal 102. Diodes 104, 106, 108 and 110 form a full-wave rectifier. A 10 volt, 100 microfarad capacitor is connected across zener diode 114. The voltage present across diode 114 is output supply voltage 132 for the sensing end of the invention.

Figure 5:
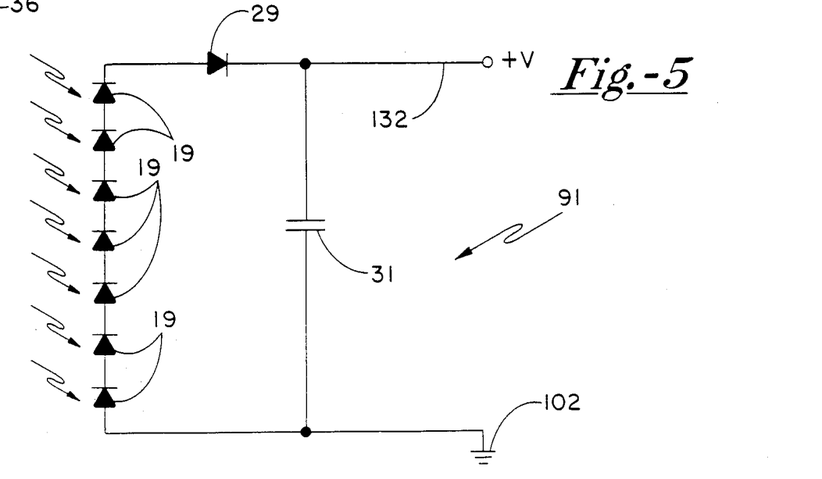
FIG. 5 is a schematic of an alternative multi-diode optical-to-electrical converter.

FIG. 5 shows an alternative multi-diode opto-electro converter 91 having a plurality of photo-diodes 19 connected in series having the first cathode connected to the anode of diode 29 and the anode at the other end of the series 19 connected to sensing end ground 102. Filter capacitor 31 is connected across from the cathode of diode 29, at output 132, to ground 102. The feature of opto-electro converter 91 is its simplicity. Diode 29 and capacitor 31 replace all the electronics 90 in FIG. 3 when diodes 19 are used in lieu of diode 18.

The clock signal detected at photodiode 18 is only about 0.2 volts. Clock picking-off circuit 120 functions as an amplifier for increasing the voltage level of the clock signal to a TTL voltage level. The first anode of photodiode 18 is connected to input resistor 116 which has a value of 47,000 ohms. Resistor 116 is connected to 1 megohm resistor 118 and to the base of 2N2222 NPN transistor 122. The emitter of transistor 122 is connected to terminal 102. The collector of transistor 122 is connected to 100,000 ohm resistor 124 and to 150,000 ohm resistor 128. Resistor 118 is connected to output supply voltage 132, to resistor 124 and to 10,000 ohm resistor 126. Resistor 128 is connected to the base of 2N2222 transistor 130. The emitter of transistor 130 is connected to terminal 102. Resistor 126 is connected to the collector of transistor 130. The output of clock picking-off circuit 120 is at the collector of transistor 130.

A/D converter 134 receives its clock input at pin 7 from the collector of transistor 130. Pin 40 is connected to reference terminal 102. Pin 25 is connected to voltage supply 132. Pin 1 is the analog input to converter 134. Pin 35 is the voltage reference output. Pin 8 is the sample output pulse which means that converter 134 samples the input at pin 1 when the sample pulse is high for two bits of a clock input at pin 7. Pin 11 is the bit clock output which synchronizes each bit of the conversion cycle. The bit clock rate is the clock rate divided by 25. Pin 24 is the serial digital data output of converter 134. The data output is not valid during the sample pulse output. The most significant bit of the serial output occurs during the first bit clock after the sample pulse.

Chip 142 is a 74HC4538 type integrated circuit having two multivibrators. The sample pulse from pin 8 of converter 134 goes to the A input of the first multivibrator of chip 142. The bit clock output goes to the B input of the first multivibrator. The serial data output from pin 24 of converter 134 goes to the C input of the second multivibrator. The Q output of the first multivibrator goes to the B input of the second multivibrator. The Q output of the second multivibrator is the return signal to the control end of the invention. The two multivibrators of chip 142 provide return signal timing adjustment and pulse coordination. The return signal from chip 142 goes to 1200 ohm resistor 144 which is connected to NPN transistor 146 having the emitter connected to reference terminal 102 through 100 ohm resistor 148. Resistors 144 and 148 and transistor 146 compose the LED driving circuit for the return signal. The collector of transistor 146 is connected to the cathode of LED 30. The anode of LED 30 is connected to voltage supply 132. Each data bit in high status is transformed by chip 142 into a 1 microsecond pulse to the LED driver.

Amplifier 140 is a differential amplifier used as an interface circuit for magnetometer 136 or thermocouple 138 to the input of converter 134. Amplifier 140 receives a reference voltage from pin 35 of converter 134. The reference voltage is nominally 1.25 volts. The differential inputs are connected either to thermocouple 138 or magnetometer 136. Magnetometer 136 may be a Honeywell SSED 2719 permalloy magnetometer. The output of amplifier 140 is connected to pin 1 of converter 134.

Figure 6:
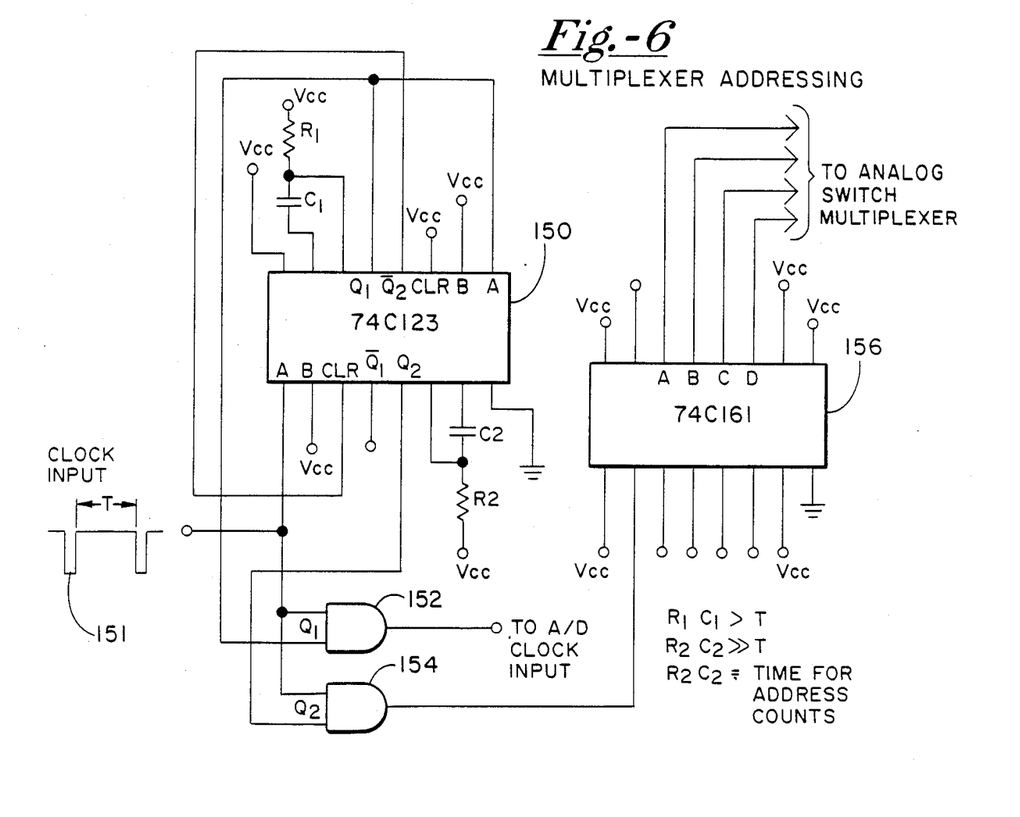
FIG. 6 is a diagram of the multiplexer addressing for the invention.

Having digital electronics in the sensor end of optical powered sensors of the invention, permits utilization of several methods of multiplexing among the sensors. One method presented here centers on the use of a retriggerable one-shot circuit that allows for switching the clock input signal of the optically powered sensor either to select the multiplexer address or to clock out return data. FIG. 6 illustrates such a method of multiplexer addressing. Chip 150 is a dual retriggerable one-shot circuit. Circuit 150 uses two time constants to allow for switching between a multiplexer address mode or a clock-out return data mode. The clock-out return data mode is the normal mode. Circuit 150 is switched into the multiplexer mode by missing (or delaying) an incoming pulse, side one of the one shot times out and triggers the circuit to switch into the address mode. The clock increment and counter provide the address pointer. The address pointer can mate with either a fully digital multiplexer system (i.e., in which the sensor is a signal bit sensor such as a door check) or an analog system using low power analog switches.

The first time constant ($R_1C_1$) for chip 150 exceeds the time between sequential pulses of the incoming clock. The second time constant ($R_2C_2$) for chip 150 exceeds the first time constant. The incoming clock goes to the A input of the second half of multivibrator chip 150, to an input of AND gate 152 and to an input of AND gate 154. The $Q_2$ output of the first half of multivibrator chip 150 is connected to the clear input of the second half of multivibrator chip 150. The $Q_1$ output is connected to the A input of the first half of multivibrator chip 150. The $Q_1$ output also is connected to an input of gate 152. The $Q_2$ output of the second half of multivibrator chip 150 goes to an input of gate 154. The output of gate 152, instead of to the output of clock picking-off circuit 120, is connected to the clock input of A/D converter 134 for multiplexer addressing. For multiplexer addressing, the output of clock picking-off circuit 120 is connected to the A input of the second half of multivibrator chip 150, to an input of gate 152 and to an input of gate 154.

Figure 7:
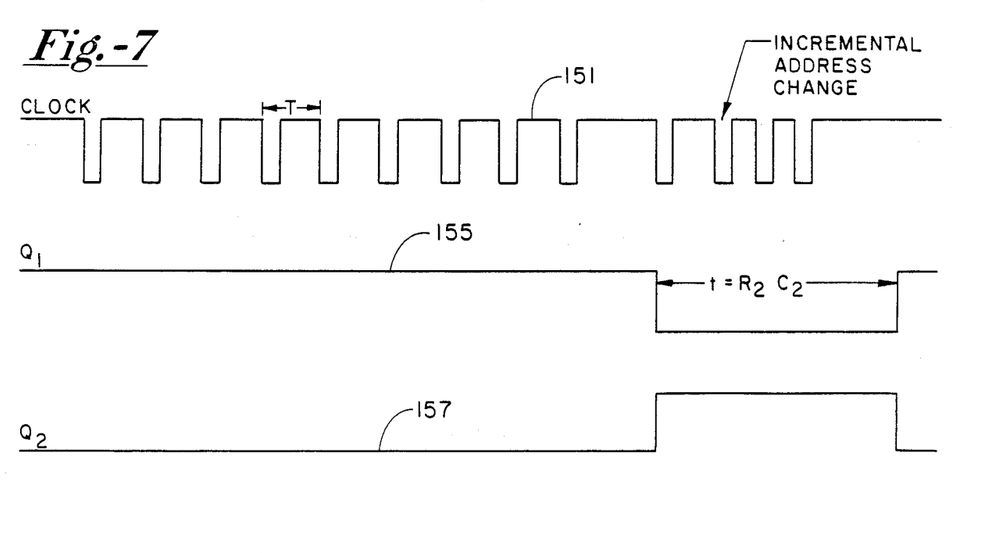
FIG. 7 shows timing relationships of multiplexer signals and input clock.
Figure 8:
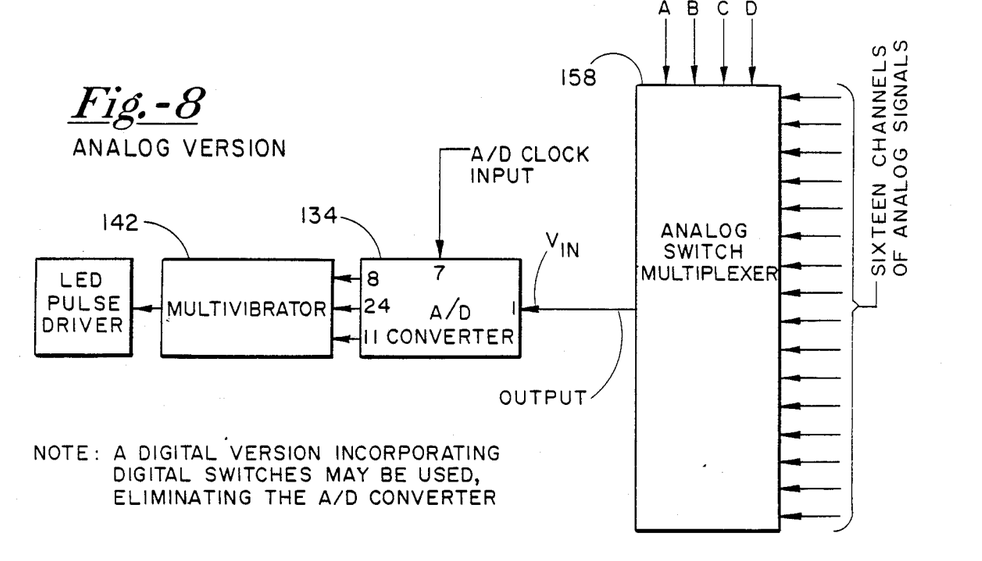
FIG. 8 illustrates an analog switch of the multiplexer.

FIG. 7 shows the timing relationship among the incoming clock 151 and the $Q_1$ and $Q_2$ outputs 155 and 157, respectively, of chip 150. The output of gate 154 goes to chip 156 which is a 74C161 type integrated circuit. The A, B, C and D outputs of chip 156 are connected to the A, B, C and D inputs, respectively, of a 16 channel analog switch multiplexer 158 in FIG. 8. The output of multiplexer 158 goes to pin 1, the analog voltage signal input, of A/D converter 134.

Figure 9:
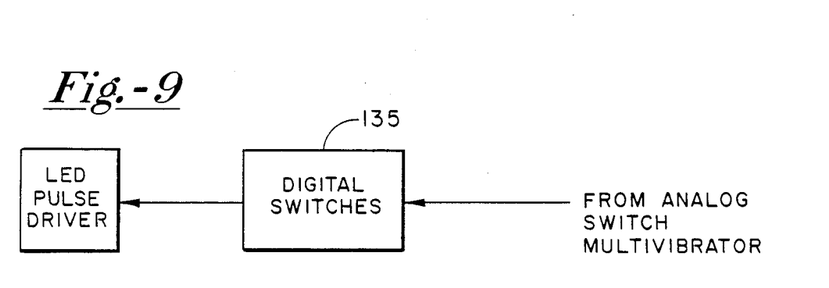
FIG. 9 shows a more digital version of multiplexing.

A more digital version, as illustrated in FIG. 9, of multiplexing may be incorporated by using digital switches 135 as sensors thereby eliminating the need for A/D converter 134.

Figure 10:
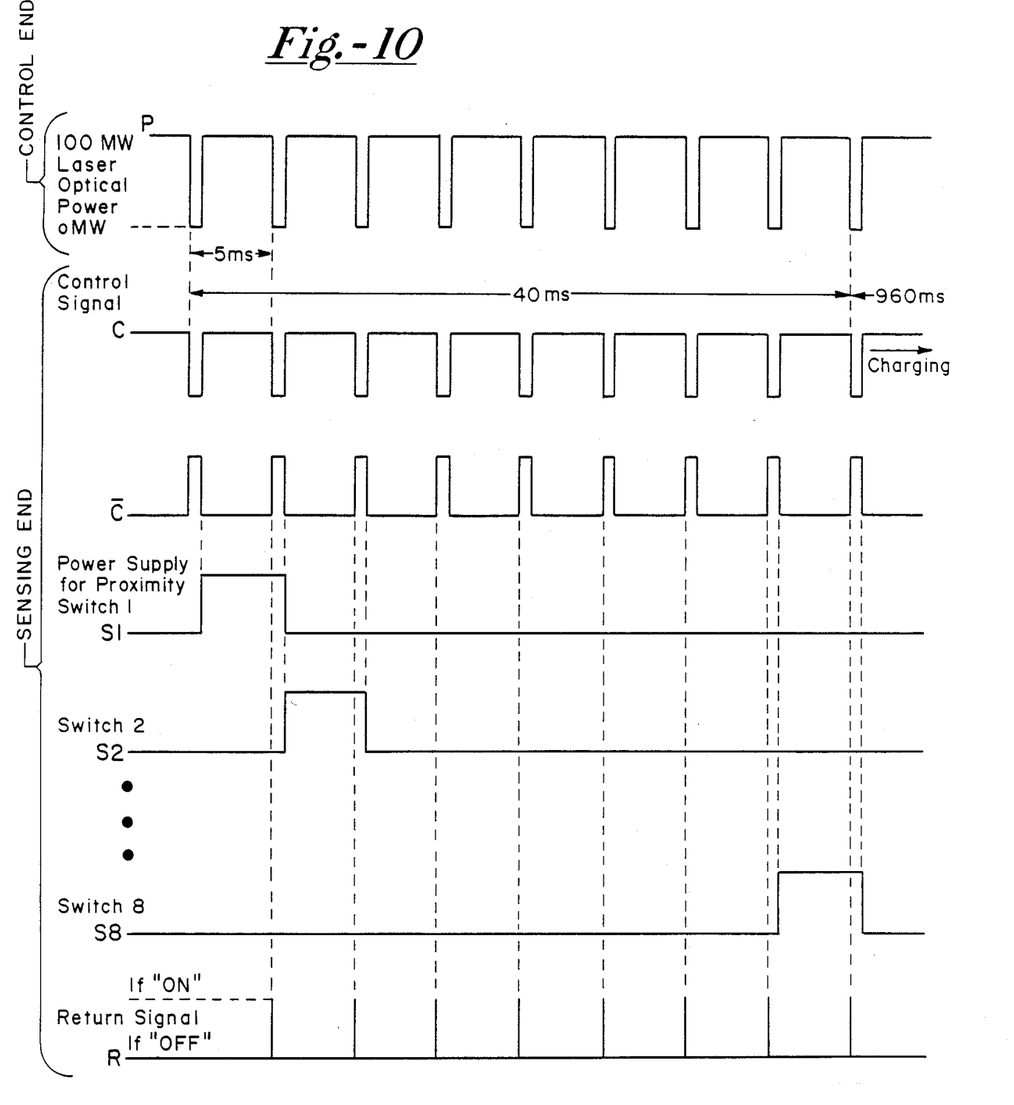
FIG. 10 is a timing diagram of the signals associated with the sensing end proximity switch.

FIG. 10 reveals the optical power signal P transmitted from the control end of the sensing end along optic fiber 16. The optical power, after conversion to electrical power, sustains an eight channel multiplexing proximity switch 170 shown in FIG. 11. The control end sends nine clock "zero" pulses. Each period between each two pulses corresponds to the power supply increment for each proximity switch. After nine pulses are sent (eight increments for eight proximity switches), then the control end sends optical power for conversion to electrical power at the sensor end.

Figure 11:
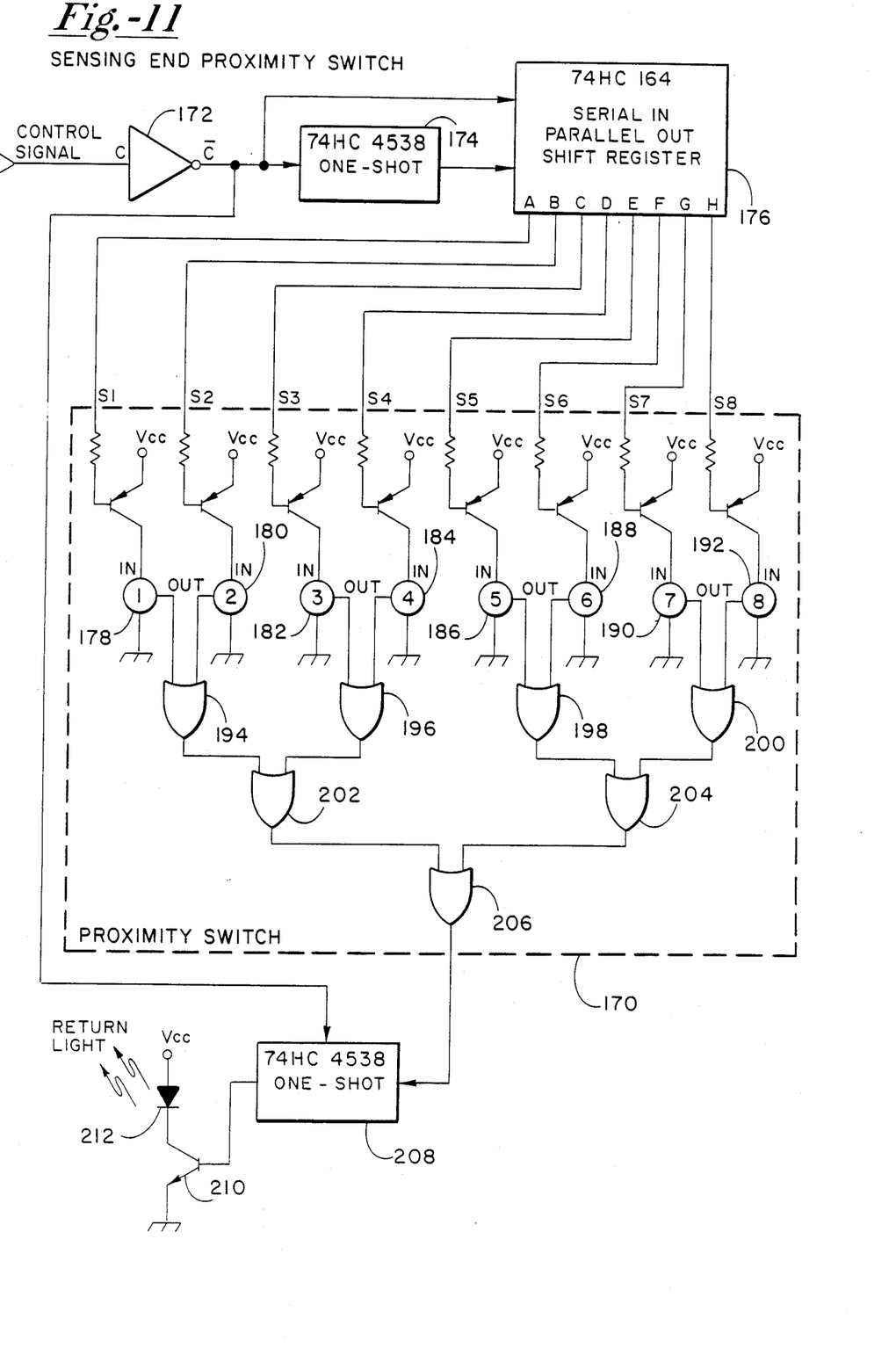
FIG. 11 is a schematic of the proximity switch and associated circuitry.

Control signal C is inverted by inverter 172 and sent to one-shot 174 and serial-to-parallel shift register 176. Signals S1 through S8 go to the bases of PNP transistors, each corresponding to the first through eight proximity switches 178, 180, 182, 184, 186, 188, 190 and 192, respectively. The outputs of each pair of proximity switches are fed to OR gates 194, 196, 198 and 200, respectively. The outputs of these OR gates are fed in pairs to OR gates 202 and 204, respectively, and the outputs of OR gates 202 and 204 are fed to gate 206. The output of gate 206 goes to one-shot 208. Signal C from inverter 172 also goes to one-shot 208. The resulting output is return signal R that is fed to the base of NPN transistor 210. The electrical return signal R is converted into an optical return signal R by light emitting diode 212. The optical signal R is coupled to fiber 16 for transmission to the control end.

FIG. 4 also shows the basic components which are available parts for constructing an embodiment of the invention. Item 34 is a 2 by 2 coupler, part no. 946-111-2200, available from Amphenol. Items 164 are fiber optic connectors, part nos. 906-500-5002 and 906-500-5007, and fiber optic adapters, part no. 905-120-5016, from Amphenol. Item 32 is an optic fiber star coupler, part no. 946-111-1800, from Amphenol. However, since item 18 includes only one photodiode, then a 2 by 2 coupler, as noted above, may be used in lieu of the star coupler. Items 18 and 19 include Honeywell photodiodes, part no. SD-3498, and Amphenol receptacles, part no. 905-138-5001. Items 30 include a Honeywell LED, part no. HFE-4000, and an Amphenol receptacle, part no. 905-138-5001. Item 14 is a laser diode, part no. SDL-2420-H2, from Spectra Diode Labs. Item 12 is a laser diode driver, part no. SDL-800, from Spectra Diode Labs. Items 36 are a Honeywell Schmitt detector, part no. SD-3324, and an Amphenol receptacle, part no. 905-138-5001. Item 16 may be (100/140 micrometer (um)) optic fiber from Spectraguide, part no. A6-420-0048-14, or from Honeywell, part no. HFA7004-302. In the sensing end, the operational amplifiers may be programmable micropower operational amplifiers, part no. OP-22, from Precision Monolithics Inc.

For an embodiment using multiwavelengths for transmission, additional parts include: wavelength division multiplexer, part no. MM-WDM850/1300-100, available from Aster of Milford, Mass.; 1300 nanometer (nm) wavelength LED's, part nos. 0665-000, LE-0399, and 1300 nm photodiodes, part no. 0668-000, from Lytel Inc. of Somerville, N.J.; and a TDK pulse transformer, part no. 133B18.

The embodiments of an invention in which an exclusive property or right is claimed are defined as follows:

1. An optically micro-powered sensor apparatus comprising:
   timing means for generating timing signals;
   source means, connected to said timing means, for providing power and the timing signals in the form of light;
   light conducting means for conveying the power and the timing signals from said source means;
   first conversion means for receiving the power and the timing signals from said light conducting means and for converting the power and the timing signals into electrical energy and electrical timing signals;
   sensor means for sensing desired parameters and for converting the parameters into electrical parameter signals;
   interface means, connected to said first conversion means and to said sensing means, for processing the electrical timing and parameter signals;
   second conversion means, connected to said interface means and to said light conducting means, for converting logic signals from said interface means into return light signals and for providing the return light signals to said light conducting means; and
   receiving means having high information communication efficiency, connected to said light conducting means and to said timing means, for receiving the return light signals from said light conducting means.

2. Apparatus of claim 1 wherein said interface means comprises multiplexer means for multiplexing signals from multiple said sensor means to said conversion means.

3. Apparatus of claim 1 wherein said first conversion means, said sensor means, said interface means and said second conversion means receive all electrical energy requirements for operation from said first conversion means.

4. Apparatus of claim 3 wherein said first conversion means, said sensor means, said interface means and said second conversion means comprise micropower components.

5. Apparatus of claim 4 wherein said timing means comprises:
   a clock generator connected to said source means;
   a first analog-to-digital converter connected to said clock generator; and
   a clock timing adjuster connected to said clock generator, to said first analog-to-digital converter, and to said receiving means.

6. Apparatus of claim 5 wherein said source means comprises:
   a driver circuit connected to said clock generator; and
   a diode connected to said driver circuit and coupled to said light conducting means.

7. Apparatus of claim 6 wherein said light conducting means is an optic fiber.

8. Apparatus of claim 6 wherein said first conversion means comprises:
   first photodiode means coupled to said light conducting means and connected to said interface means; and
   conditioning means, connected to said photodiode means and to said interface means, to said sensor means and to said second conversion means.

9. Apparatus of claim 8 wherein:
   said first photodiode means comprises a single photodiode coupled to said light conducting means and connected to said interface means; and
   said conditioning means comprises:
      a switching circuit connected said single photodiode;
      a transformer having a primary winding connected to said switching circuit and having a secondary winding;
      a rectifier connected to the secondary winding of said transformer; and
      a filter connected to said rectifier, to said interface means, to said sensor means and to said conversion means.

10. Apparatus of claim 8 wherein:
    said first photodiode means comprises a plurality of photodiodes, connected in series, coupled to said light conducting means and connected to said interface means; and
    said conditioning means comprises a filter connected to said single photodiode, to said interface means, to said sensor means and to said second conversion means.

11. Apparatus of claim 8 wherein said interface comprises:
    a clock picking-off circuit connected to said first photodiode means and to said conditioning means;
    a multiplexer addresser connected to said clock picking-off circuit and to said conditioning means; and
    a plurality of digital switches connected to said clock picking-off circuit, to said multiplexer addresser, to said second conversion means and to said conditioning means.

12. Apparatus of claim 8 wherein said interface means comprises:
    a clock picking-off circuit to connected to said first photodiode means and to said conditioning means; and
    an analog-to-digital converter connected to said clock picking-off circuit and to said conditioning means.

13. Apparatus of claim 12 wherein said interface means further comprises:
    a multivibrator connected to said analog-to-digital converter, to said second conversion means and to said conditioning means; and
    differentiating amplifier means, connected to said analog-to-digital converter, to said conditioning means and to said sensing means.

14. Apparatus of claim 12 wherein said interface means further comprises:
    a first one-shot circuit connected to said clock picking-off circuit and to said conditioning means;
    a shift register connected to said one-shot circuit, to said picking-off circuit, and to said conditioning means;
    a multi-channel proximity switch connected to said shifter register and to said conditioning means; and
    a second one-shot circuit connected to said multi-channel proximity switch, to said clock picking-off circuit, to said second conversion means and to said conditioning means.

15. Apparatus of claim 12 wherein said second conversion means comprises:
    a driver circuit connected to said multivibrator; and
    a diode coupled to said light conducting means, connected to said driver circuit and to said conditioning means.

16. Apparatus of claim 15 wherein said receiving means comprises:
    second photodiode means, coupled to said light conducting means, for converting the return light signals from said light conducting means into electrical return signals;
    translator means, connected to said second photodiode means, for translating electrical return signals into logic compatible return signals;
    return signal filter connected to said translator means and to said clock generator;
    a shift register connected to said return signal filter and to said clock timing adjuster; and
    a hexadecimal display connected to said shift register.

17. Apparatus of claim 11 wherein said interface means further comprises:
    a multiplexer addresser connected to said clock picking-off circuit and to said conditioning means; and
    an analog switch multiplexer connected to said multiplexer addresser, to said analog-to-digital converter, to a plurality of said sensing means, and to said conditioning means.

18. An optically micro-powered sensor apparatus comprising:
    an optic fiber;
    a first diode, coupled to said optic fiber, for sending optical powered timing signals;
    a first driver connected to said first diode;
    a clock generator connected to said driver;
    a second diode, coupled to said optic fiber, for receiving optical power and timing signals;
    a voltage step-up circuit connected to said second diode;

a filter circuit, connected to said voltage step-up circuit, for providing electrical powers converted from the optical power;

a clock picking-off circuit, connected to said second diode and to said filter circuit for extracting timing signals;

an analog-to-digital converter connected to said clock picking-off circuit and to said filter circuit;

a plurality of sensors, some of said sensors connected to said filter;

a plurality of amplifiers connected to said plurality of sensors and to said filter circuit;

a multiplexer connected to said plurality of amplifiers, to said analog-to-digital amplifier, to said clock picking of circuit, and to said filter circuit;

a second driver connected to said analog-to-digital converter, and to said filter circuit;

a third diode coupled to said optic fiber for transmitting return signals containing information from said plurality of sensors, connected to said second driver and to said filter circuit;

a fourth diode coupled to said optic fiber for receiving the return signals;

a return signal filter connected to said fourth diode; and means for intelligible interpretation of the return signals, connected to said return signal.

19. A method for sensing a plurality of parameters at remote locations having no power source, via an optic fiber, comprising:

sending optical power and optical timing signals through the optic fiber;

converting the optical power and timing signals to remote electrical power and timing signals;

sensing the plurality of parameters, with aid of the remote electrical power;

converting sensed parameters into analog parameter signals, with aid of the remote electrical power;

multiplexing analog parameter signals, with aid of the remote electrical power;

converting the analog parameter signals into electrical digital parameter signals sychronized with the timing signals, with the aid of the remote electrical power;

converting the electrical digital parameter signals into optical parameter signals;

transmitting the optical parameter signals via the optic fiber;

receiving the optical parameter signals from the optic fiber;

converting the optical parameters signals into electrical parameter signals; and deciphering the electrical parameter signals into an intelligible interpretation.

* * * * *